United States Patent [19]

Hierholzer, Jr.

[11] Patent Number: 4,467,265

[45] Date of Patent: Aug. 21, 1984

[54] BATTERY CHARGER

[75] Inventor: Alton G. Hierholzer, Jr., Seguin, Tex.

[73] Assignee: Wide-Lite International Corporation, San Marcos, Tex.

[21] Appl. No.: 456,623

[22] Filed: Jan. 10, 1983

Related U.S. Application Data

[63] Continuation of Ser. No. 225,374, Jan. 15, 1981, abandoned.

[51] Int. Cl.³ .............................................. H02J 7/00
[52] U.S. Cl. ....................................... 320/17; 320/20; 320/24; 320/40
[58] Field of Search ................. 320/6, 7, 15, 16, 17, 320/20, 21, 22, 23, 24, 39, 40

[56] References Cited

U.S. PATENT DOCUMENTS

| | | | |
|---|---|---|---|
| 3,517,294 | 6/1970 | Ruben | 320/39 |
| 3,911,349 | 10/1975 | Seeley et al. | 320/39 |
| 4,047,088 | 9/1977 | Himmler | 320/17 |
| 4,191,918 | 3/1980 | Nicholls | 320/23 |

Primary Examiner—William M. Shoop
Assistant Examiner—Anita M. Ault
Attorney, Agent, or Firm—Vaden, Eickenroht, Thompson, Bednar & Jamison

[57] ABSTRACT

A battery charger with an SCR providing high charging current to a battery until a predetermined high voltage level is sensed. When the voltage sensed reduces to a float voltage minimum level, a trickle charge current is supplied through another SCR until a float voltage maximum level is sensed, which suspends trickle charge current until the voltage again reduces to the float voltage minimum level. When a load reduces the battery voltage so that the sensed voltage is reduced to a predetermined low level below the float voltage minimum level, then the high charging current SCR is again gated on to charge the battery.

3 Claims, 1 Drawing Figure

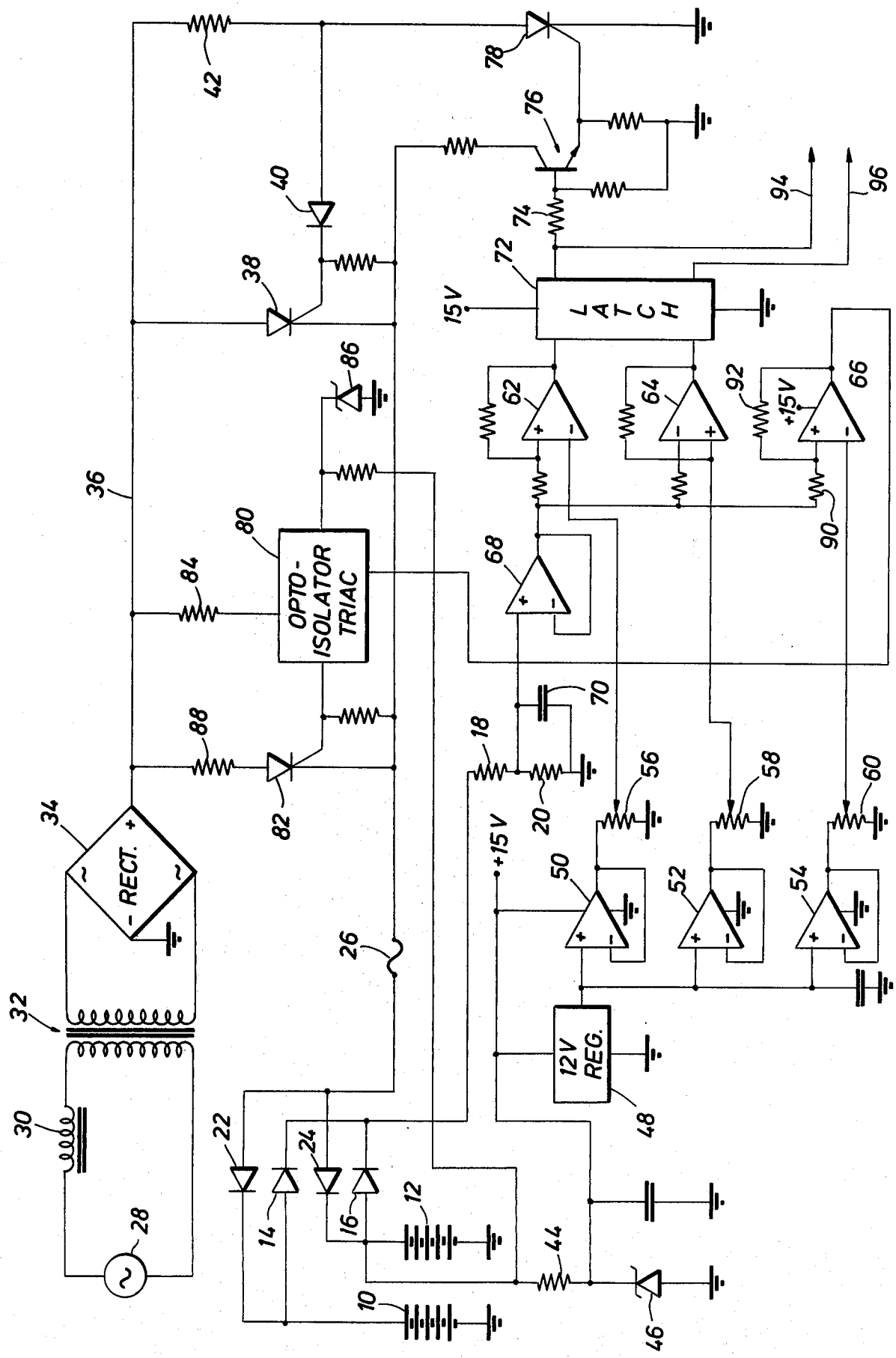

BATTERY CHARGER

This is a continuation of application Ser. No. 225,374 filed Jan. 15, 1981 now abandoned.

BACKGROUND OF THE INVENTION

This invention pertains to a battery charger and specifically to a battery charger that automatically charges the batteries to which it is connected between a float voltage minimum and a float voltage maximum at a trickle charge rate and then at a faster rate and to a higher level when the voltages on such batteries fall below a predetermined low voltage below a float voltage minimum.

DESCRIPTION OF THE PRIOR ART

Batteries in one common application provide emergency power to loads whenever the main power to a load is interrupted. This is particularly important in situations where the cessation of power cannot be tolerated, such as providing light to a hospital emergency room, power to computer systems to prevent the loss of data temporarily stored in non-permanent storage condition and the like.

It is quite common, however, for batteries to be in a stand-by condition for long periods of time before they are required to be of service. When they are required, it is extremely distressing to discover that the voltage level on the batteries has decayed while they were not in service and therefore cannot provide the power which is expected of them.

Therefore, it is a common practice to provide batteries that are in a ready, but non-operating mode, with a constant "trickle" charge. The trickle charge compensates for the aging of the shelfstored batteries, but too much charge also is not good for the batteries. When a battery is overcharged, the electrolyte is bubbled off, and the overcharged conditions on the battery cause it to wear out faster than it otherwise should.

It is exceedingly difficult, if not impossible, to place a constant trickle charge which is enough but not too much. To prevent overcharging it is a common practice to provide a switch to the charger, which switch is switched off by a voltage sensing device when the battery rises to a float voltage maximum and which switch is switched on when the battery falls to a float voltage minimum.

It is also known, that a battery which is very low can be charged without harm to its rated value at a more rapid rate than a battery just below its rated value. Therefore, manually operated battery chargers often have switches for providing either fast charge or slow charge with meters or other indicators to show the operator when to attend to the switches. Of course, such a battery charger is not suited to an unattended, battery stand-by situation.

It is also known that it is stimulating and good for a battery to occasionally be slightly overcharged to agitate the electrolyte, which the trickle-charge battery charger in the prior art described above never do.

Therefore, it is a feature of the present invention to provide an improved battery charger for sensing a predetermined battery voltage below float voltage minimum and charging at a higher rate than when the battery is in its normal standby condition between float voltage minimum and float voltage maximum, during which condition the charger only provides a necessary trickle voltage or a charge at a lower rate.

It is another feature of the present invention to provide an improved battery charger which charges to a predetermined voltage above float voltage maximum when the battery is first charged or when the level has fallen to below a predetermined low voltage below float voltage minimum.

It is still another feature of the present invention to provide an improved battery charger which provides switched toggle charging provided by a trickle voltage except when the battery voltage is loaded to below a predetermined low voltage below float voltage minimum, at which time a high voltage charge is provided.

SUMMARY OF THE INVENTION

The invention embodiment disclosed provides high charge current through an SCR when the charger is activated or when the voltage on the battery being charged is sensed to be at a predetermined low level below float voltage minimum. A regulated dc derived from a battery under charge provides a reference voltage to a first comparator, the other input thereto being from the voltage level sensor connected to the battery. When the level reaches a certain predetermined high voltage above float voltage maximum, the comparator produces an output to set a latch or flip-flop, which, in turn, supplies a base voltage to a transistor emitter-follower, which gates on a second SCR, having one of its main terminals connected to ground. When this second SCR is turned on, it draws off current from the gate of the first SCR and turns off the high charge current to the battery.

A second reference-voltage-and-comparator produces an output when the voltage on the battery falls to float voltage minimum, to gate on a third SCR, this one having a series resistor connected thereto, to provide a trickle charge to the battery. The hysteresis operation of this second comparator as it senses that the voltage on the battery has reached the float voltage maximum level shuts off or removes the gate from the third SCR and removes the trickle charge to the battery until the float voltage minimum level again occurs.

In the presence of a load or for some other reason, the sensed voltage on the battery may drop below a predetermined low voltage below the float voltage minimum. When this occurs, a third reference-voltage-and-comparator produces an output that resets the latch, which turns off the emitter-follower and second SCR and gates on the first or high charge current SCR connected to the battery.

More than one battery can be charged with the battery charger by providing sensing and isolating diodes before respective connections to the voltage sensor part of the circuit and to the charging SCR's, respectively. The isolating diodes prevent transients from circuit operation and from another battery from interferring with the charging operation of a given battery. The sensing diodes provide the battery with the lowest voltage to receive the most charge while not overcharging the other batteries, until all of the batteries connected to a common charger are substantially charged the same.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the appended drawing, which drawing forms a part of this specification. It is to be noted, however, that the appended drawing illustrates only a preferred embodiment of the invention and is therefore not to be considered limiting of its scope, for the invention may admit to other equally effective embodiments.

In the drawing:

The FIGURE is a simplified schematic and block diagram of a preferred embodiment of the present invention.

DESCRIPTION OF PREFERRED EMBODIMENT

Now referring to the drawing, for illustrative purposes batteries 10 and 12 are shown connected to the battery charger for charging in accordance with the present invention. Of course, one battery or any number of batteries similarly connected may be charged by the apparatus shown. The high end of battery 10 is connected to the anode of sensing diode 14 and the high end of battery 12 is connected to the anode of diode 16. The cathodes of these diodes are connected to resistor 18, one of a series pair with resistor 20, which form a voltage divider. The junction between these points establishes a voltage sensing point for purposes hereafter explained. The negative end of the batteries and the opposite end of resistor 20 from the end connected to resistor 18 are connected to circuit common, which, for convenience, is illustrated as ground.

The high side of battery 10 is connected to the cathode of isolation diode 22 and the high side of battery 12 is connected to the cathode of isolation diode 24. The anodes of these two diodes are connected to fuse 26 and then to the charging portion of the circuit, as explained below.

The ac power distribution line is illustrated as ac source 28 and is connected via choke inductor 30 to a voltage dropping transformer 32, in conventional fashion. Choke inductor 30 limits the crest of the current applied from the ac power distribution line, typically at 120 volts, 60 Hz. Also, the current peak is smoothed over a half cycle and, therefore, power factor correction is also achieved. The output voltage from the secondary of transformer 32 is rectified in full-wave bridge rectifier 34 and the output current is available on line 36.

A thyristor, preferably in the form of SCR 38 is connected so that its main terminals connect line 36 with fuse 26 connected to the batteries through isolating diodes 22 and 24. The gate of SCR 38 is connected through diode 40 to a gate voltage provided by dropping resistor 42.

In operation of the circuit so far described, SCR 38 is gated on for almost each half cycle of the rectified voltage to supply charging current via line 36 to the batteries. For a nominal 60-volt battery, the charging current through this main SCR is typically 10 amperes.

Battery 12 is also connected through resistor 44 to Zener diode 46 to provide a nominal 15-volt power supply. A 12-volt regulator 48 connected to this 15-volt output provides a regulated 12-volt output to each of three buffer amplifiers 50, 52 and 54. The outputs of these buffers are respectively connected to variable resistors 56, 58 and 60 to establish three different reference voltages respectively to comparators 62, 64 and 66. The other or compared inputs to these three comparators are each provided by buffer amplifier 68, the input of which is connected to the junction of resistors 18 and 20. It should be noted that the reference voltage is supplied to the "−" input for comparators 62 and 66 and is supplied to the "+" input for comparator 64 for purposes to be described below. Capacitor 70 in parallel with resistor 20 reduces ripple by providing some filtering.

The output of comparator 62 is connected to latch or flip-flop circuit 72. The output of latch 72 is connected through base resistor 74 to emitter-follower 76, the emitter of which is connected to the gate of a thyristor in the form of SCR 78. The main terminals of SCR 78 are connected respectively to the junction between diode 40 and resistor 42 and common or ground.

In operation of the low voltage section of the circuit so far described, it is assumed that the voltage at the junction point between resistor 18 and 20 reflects a battery voltage which is quite low or, for purposes of discussion, below a predetermined low voltage below the float voltage minimum for the circuit. Hence the relationship of the reference voltage and the sensed or compared voltage applied to comparator 62 produces no output. Hence, there is no drive supplied to emitter-follower 76. Also, SCR 78 remains ungated. As previously discussed, this provides a high charging current through SCR 38 to the batteries.

Eventually, the voltage rises past the float voltage minimum, past the float voltage maximum and eventually to a predetermined high voltage above the float voltage maximum. When this occurs, there is an output from comparator 62, which sets latch 72 to produce a drive current to the base of emitter-follower 76. When transistor 76 conducts, SCR 78 is gated on and places the input voltage on the gate of SCR 38 near ground, thereby cutting off SCR 38.

Now referring to the trickle charge network of the circuit, the output of comparator 66 is connected to an element 80 for isolating the low voltage part of the circuit from SCR 82. Preferably, isolation element 80 is an optoisolated triac, Motorola MOC3011. This element is connected through resistor 84 to line 36 and to voltage clamping Zener diode 86 for proper operation. Operation with respect to SCR 82 is such that when the input from comparator is removed, SCR 82 receives a proper gate for turning on the SCR. Conversely, when there is an output from comparator 66, the gate is removed from SCR 82 to turn the SCR off.

SCR 82 has one of its main terminals connected in series with resistor 88 and its other main terminal to provide charging current to the batteries. Resistor 88 assures that the current through SCR 82 when it is conducting is very much less than the current through SCR 38 when it is conducting. For example, the trickle charge current is typically about 200 milliamperes when the high charge current is about 10 amperes.

In operation of this part of the circuit, when the voltage sensed on the battery descends until it is at the float voltage minimum value, the removal of the output from comparator 66 to isolation element 80 gates on SCR 82 to provide the trickle charge to the batteries and to cause them to charge up at a slow rate. Resistors 90 and 92 connected to comparator 66 provide hysteresis action in typical fashion so that before there is an output again from comparator 66, there has to be a discernible rise in the voltage on the batteries. Therefore, when the level reaches the float voltage maximum level, there is an output from comparator 66 for gating off comparator 82. The action "toggles" between the float voltage maximum and float voltage minimum levels in the manner just described.

Assume now, for purposes of discussion, that a large load, typically one drawing 60 amperes, is placed on the batteries so that the voltage level sensed falls, in spite of the trickle charge, to a level to the selected predetermined low voltage below float voltage minimum. When this happens, there is an output from comparator 64 to reset latch 72 and remove drive current from the base of emitter-follower 76. As explained above, this gates on SCR 38 to again provide high charge current therethrough to the batteries.

It should be noted that diodes 22 and 24 effectively prevent transients from the circuit or from the other battery or batteries from affecting the charge on the batteries connected thereto. Further, since the batteries are connected to a common point to the charging network just described, the charge provided tends to be supplied to the battery most in need.

A typical operation establishes the four voltage operation points per battery cell, as follows: float voltage minimum at 2.2 volts; float voltage maximum at 2.3 volts; predetermined low voltage below float voltage minimum at 2.0 volts; and predetermined high voltage above float voltage maximum at 2.7 volts.

When trickle charge only is being applied to the batteries, latch 72 is set and there is an output on line 94 that can be connected to the appropriate lamp or other indicator. On the other hand, when full or high charge current is being supplied to the batteries, the latch is unset and therefore there is an output on line 96 that can be connected to a lamp or other indicator, if desired.

Ordinarily, when the batteries are used, there has been a power failure or effective removal or cessation of the ac power on the distribution line. Since there has been a power drain, the voltage sensed on the batteries would be quite low. But, even with fully charged batteries or initial activation of the circuit, if latch 72 is unlatched, the high current charge will be supplied until latch 72 is set, as previously described.

While a particular embodiment of the invention has been shown and described, it will be understood that the invention is not limited thereto, since many modifications may be made and will become apparent to those skilled in the art.

What is claimed is:

1. A battery charger, comprising
first switching means connectable to a dc charging source for supplying substantially constant, relatively high charging current at a first amplitude to a battery under charge for charging the battery to a predetermined high voltage above a float voltage maximum,
voltage sensing means connected to the battery,
second switching means connected to said voltage sensing means for disconnecting said first switching means when the voltage on the battery rises to said predetermined high voltage,
third switching means connectable to the dc charging source for supplying a relatively low trickle charging current at a second amplitude to the battery when the voltage on the battery drops to a float voltage minimum and removing the low trickle charging current to the battery when the voltage on the battery rises to the float voltage maximum, and
fourth switching means connected to said voltage sensing means for reconnecting said first switching means to the battery when the voltage on the battery drops to a predetermined low voltage below the float voltage minimum, said fourth switching means including voltage reference means for establishing a reference voltage,
a comparator connected to said voltage sensing means and said voltage reference means, and
a latch connected to the output of said comparator and to the input of said second switching means for resetting said latch when the voltage on the battery drops to said predetermined low voltage below the float voltage minimum for switching said second means to connect said first switching means to said dc charging source, said latch setting when the voltage on the battery rises to said predetermined high voltage above the float voltage maximum for disconnecting said first switching means from said dc charging source.

2. A battery charger in accordance with claim 1, and including
indicator means connected to the outputs of said latch for indicating conditions of high and trickle-only charge of the battery charger.

3. A battery charger for charging a first battery and a second battery, comprising
first switching means connectable to a dc charging source for supplying substantially constant, relatively high charging current at a first amplitude to the first battery and the second battery under charge for charging the batteries to a predetermined high voltage above a float voltage maximum,
voltage sensing means connected to the first battery and to the second battery,
second switching means connected to said voltage sensing means for disconnecting said first switching means when the voltage on the batteries rises to said predetermined high voltage,
third switching means connectable to the dc charging source for supplying a relatively low trickle charging current at a second amplitude to the batteries when the voltage on the batteries drop to a float voltage minimum and removing the low trickle charging current to the batteries when the voltage on the batteries rise to the float voltage maximum,
a first sensing diode connected between the first battery and said voltage sensing means,
a second sensing diode connected between the second battery and said voltage sensing means,
a first isolating diode oppositely poled to said first sensing diode connected between the first battery and said first switching means, and
a second isolating diode oppositely poled to said second sensing diode connected between the second battery and said first switching means.

* * * * *